United States Patent [19]

Sieben

[11] Patent Number: 4,524,927
[45] Date of Patent: Jun. 25, 1985

[54] MAGNETIC-TAPE CASSETTE WITH A FLEXIBLE LATCH FOR A COVER

[75] Inventor: Joannes H. F. C. Sieben, Eindhoven, Netherlands

[73] Assignee: U.S. Philips Corporation, New York, N.Y.

[21] Appl. No.: 513,942

[22] Filed: Jul. 15, 1983

[30] Foreign Application Priority Data

Aug. 17, 1982 [NL] Netherlands ............... 8203219

[51] Int. Cl.³ .................. G03B 1/04; G11B 15/32
[52] U.S. Cl. ............................. 242/198; 360/132
[58] Field of Search ..................... 242/197–200; 352/72, 78; 360/93, 132

[56] References Cited

U.S. PATENT DOCUMENTS 4,173,319 11/1979 Umeda ..................... 242/199
4,418,373 11/1983 Fujimori et al. .............. 360/132
4,422,599 12/1983 Okamura et al. ............. 242/198

Primary Examiner—Leonard D. Christian
Attorney, Agent, or Firm—David R. Treacy

[57] ABSTRACT

In a magnetic-tape cassette with a front aperture or recess at least one front cover is provided which can pivot under spring force from an open position to a closed position about a pivot which is perpendicular to the side walls of the housing of the cassette, which cover is latched in the closed position by means of at least one latching lever disposed near a side wall. The latching lever, which comprises two arms arranged in the form of an L can pivot into a latching position about a pivot which is arranged on said side wall parallel to the pivot of the front cover. The longer arm of the lever is elastically deflexible over at least a part of its length and at one end comprises a latching portion which during the pivotal movement of the lever is guided by guide means disposed near the latching portion. The shorter arm is connected at one end to the pivot of the latching lever.

14 Claims, 2 Drawing Figures

MAGNETIC-TAPE CASSETTE WITH A FLEXIBLE LATCH FOR A COVER

BACKGROUND OF THE INVENTION

The invention relates to a magnetic-tape cassette comprising a housing having first and second substantially parallel flat major walls, first and second substantially parallel side walls, a rear wall and a front with a front aperture or recess between the major walls; two rotatable reel hubs arranged between the major walls; a magnetic tape which is connected at its ends to the reel hubs and which has a portion which extends across said front aperture or recess in the housing to co-operate with parts of a magnetic-tape cassette apparatus; at least one front cover which is pivotable from an open position to a closed position under spring force about a pivot which is perpendicular to the side walls of the housing, which front cover at least partly covers the front aperture or recess in the housing in the closed position; and at least one latching lever which is pivotable about a pivot which is connected to the housing, which lever is situated near one of the side walls and pivots under spring force from an inoperative position to a latching position in which the latching lever latches the front cover in the closed position.

A magnetic-tape cassette of this type is known and, in particular, is used very extensively for recording and reproducing video signals by means of a magnetic video-tape apparatus. This known magnetic-tape cassette comprises a front cover which ensures that the portion of magnetic tape which extends across the front aperture or recess cannot be damaged. The front cover also seals the cassette so as to inhibit the penetration of contaminants and dust. In order to ensure that the front cover remains in the closed position after the magnetic-tape cassette has been removed from the magnetic-tape apparatus, the cover in the known cassette is latched in the closed position by means of the latching lever. The housing of this known magnetic-tape cassette is comparatively large, so that this cassette is less suitable for use in equipment in which only a limited space is available for the cassette. In particular for use in video cameras with built-in magnetic-tape apparatus it is desirable to have a magnetic-tape cassette of small dimensions. Such a cassette of smaller dimensions should comprise component parts, which despite frequent use will still perform reliably after a long period of time. A vulnerable part is the front cover of the magnetic-tape cassette with the associated latching lever. In the known cassette the active latching portion of the latching lever is disposed at a comparatively short distance from the pivot of the front cover. If the front-cover/latch construction in the known cassette is simply made smaller in order to obtain a cassette of smaller dimensions, only a small force on the front cover would suffice to swing the front cover open, without the latch being set to the inoperative position. Furthermore, this known cassette comprises a latch which occupies much space, which is not available in a cassette of smaller dimenions.

SUMMARY OF THE INVENTION

It is the object of the invention to provide a magnetic-tape cassette of the type mentioned in the opening paragraph, which cassette comprises a front-cover latching means which occupies little space and is yet reliable.

In accordance with the invention the latching lever comprises two arms of different lengths arranged in the form of an L. The longer arm is elastically deflectible over at least a part of its length and includes a latching portion at is end which is remote from the shorter arm, and the shorter arm is connected to the pivot of the latching lever at its end which is remote from the longer arm. The pivot of the latching lever extends substantially parallel to the pivot of the front cover and is connected to the side wall of the housing near which the lever is arranged. The latching lever is guided by a guide means disposed near the latching portion.

In this magnetic-tape cassette the latching portion of the latching lever and the pivot of the front cover can be arranged at a comparatively large distance from each other, so that a substantial force is required for opening the front cover when the latching lever is in the latching position. This precludes inadvertent opening of the invention is used in the front cover. Moreover, this construction of the magnetic-tape cassette ensures that even if a substantial force is exerted on the front cover the latching lever can pivot as a result of the elastic deflection of the longer arm, so that the latching portion moves sufficiently far away from the front cover to avoid damage to the latching portion, the remaining portion of the latching lever or the front cover. Furthermore, the construction of the latching lever has the advantage that it obviates the need for a separate spring, which also occupies some space. The construction used for the latching means for the front cover in the magnetic-tape cassette in accordance with the invention is therefore particularly suitable for use in cassettes of small dimensions.

A preferred embodiment of a magnetic-tape cassette in accordance with the invention is characterised in that the latching portion is situated on the opposite side of the front-cover pivot from the pivot of the latching lever. Thus within the space available for this in the cassette housing, the longer arm of the latching lever may have a comparatively large length, so that the longer arm can have optimum elasticity. Moreover, when the latching lever is pivoted from the latching position to the inoperative position, this results in a smooth movement of the latching portion.

Another preferred embodiment of a magnetic-tape cassette in accordance with the invention is characterised in that the shorter arm of the latching lever comprises a fork-shaped end portion with resilient limbs which clamp around the pivot of the latching lever. This enables the latching lever to be fitted in a simple manner during assembly of the magnetic-tape cassette, which is of advantage if only a limited space is available for mounting the latching lever. Moreover, it is thus possible to use the latching lever to advantage both in the case of a housing which comprises a box-and-lid section and in the case of a housing which comprises two complementary halves.

A further embodiment of the invention is used in a magnetic-tape cassette in accordance with the invention, in which the front cover comprises side portions which are arranged at the sides of the housing substantially parallel to the side walls thereof and are connected to the pivots of the front-cover and which are disposed substantially in line with the major portions of the side walls, and in which these side walls comprise inner wall portions disposed on the inner sides of the side portions of the front cover. This embodiment is characterised in that at least the side wall near the lever further comprises an outer wall portion which adjoins the major portion of that side wall, the pivot of the latching lever extends between the inner and outer wall portions of the near one of the side walls, and the latching lever is arranged in a space which is bounded on one side by the inner wall portion of the near one of the side walls and on the other side by the adjacent side portion of the front cover and the outer wall portion of this side wall. The latching lever is thus conveniently accomodated at an appropriate location in the housing of the magnetic-tape cassette.

Advantageously, in this respect a further embodiment of a magnetic-tape cassette in accordance with the invention is characterised in that the shorter arm of the latching lever is situated between the inner wall portion and the outer wall portion of the near side wall and the latching lever comprises a projection which adjoins the shorter arm and which is disposed at the location of a recess in this outer side wall portion. Through this recess the latching lever is readily accessible to a co-operating part of a magnetic-tape apparatus in order to be pivoted by this part from the inoperative position to the latching position.

An embodiment of the invention, given by way of a non-limitative example, will be described in more detail with reference to the drawings.

DESCRIPTION OF THE PREFERRED EMBODIMENT

Figure 1:
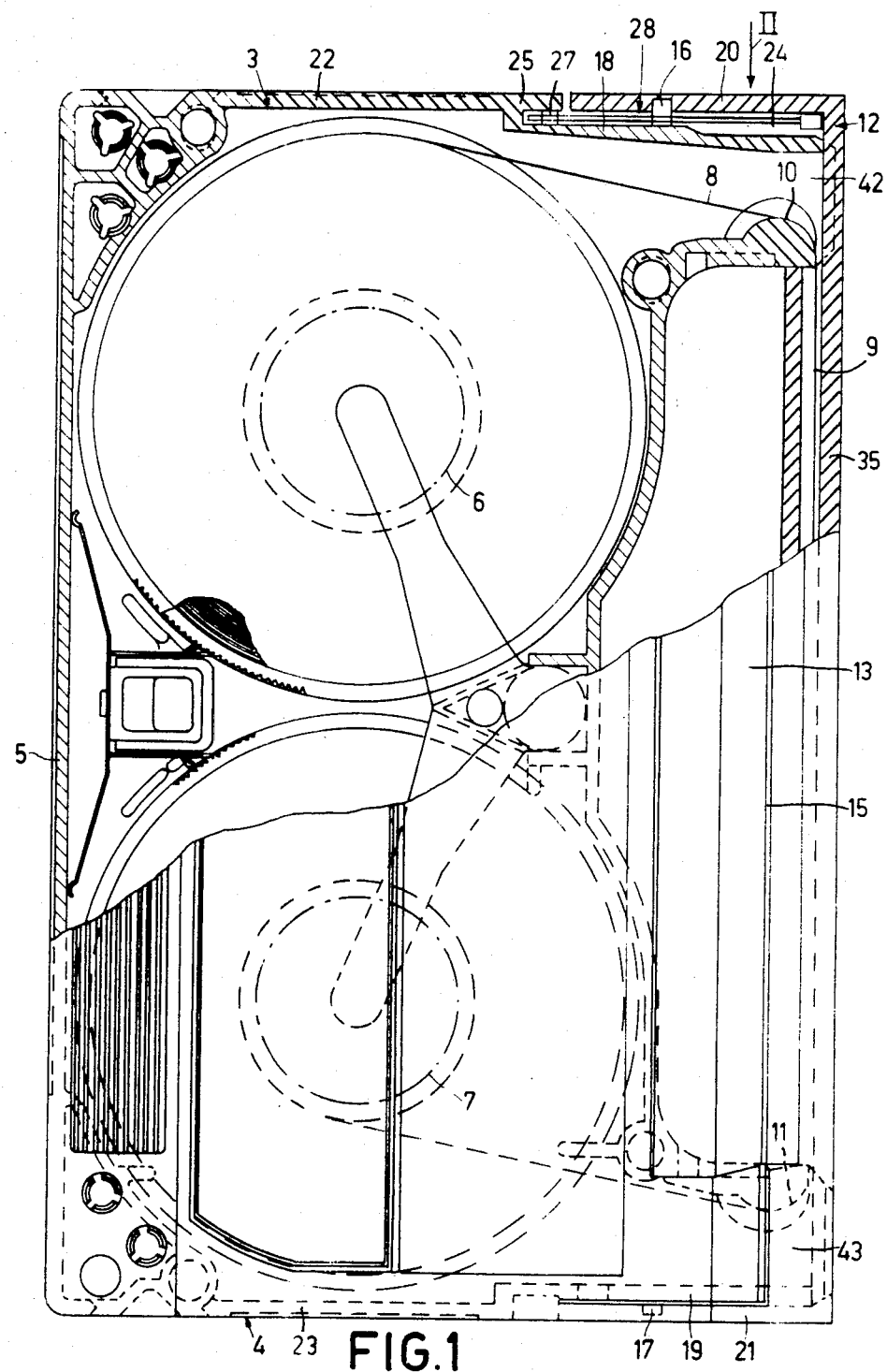
FIG. 1 is a part-sectional plan view of a magnetic-tape cassette in accordance with the invention.

The magnetic-tape cassette shown in the drawings comprises a housing having first and second substantial parallel flat major walls 1 and 2, first and second substantialtially parallel side walls 3 and 4, a rear wall 5, and a front with a front aperture or recess between the two major walls 1 and 2. The front aperture is formed by recesses in the front edges of the major walls 1 and 2. Between these major walls are two rotatable reel hubs 6 and 7, on which turns of a magnetic tape 8 are wound. A portion 9 of the magnetic tape extends across the front aperture or recess and passes round the tape supports 10 and 11.

At the front of the housing are two front covers 12 and 13, which are each pivotable between a closed position and an open position about pivots which are perpendicular to the side walls 3 and 4, the covers at least partly covering the front aperture or recess of the magnetic-tape cassette in the closed position. In the open position of the covers the portion 9 of magnetic tape which extends across the front aperture or recess of the magnetic-tape cassette can be wound between an inactive position, in which it is disposed between the recesses in the major walls 1 and 2 of the housing, and an active position, in which it is disposed outside the housing of the magnetic-tape cassette for co-operation with parts of a magnetic-tape cassette apparatus, not shown, such as magnetic heads and tape guides.

The front cover 12, which forms an outer cover, is disposed at the periphery of the housing and during its pivotal movement controls, in a manner not shown, the movement of the front cover 13, which forms an inner cover. The two covers are arranged to cooperate with each other in such a way that, as is shown in the drawings, in the closed position the two covers overlap each other at the side of the housing at which the major wall 1 is situated, the edges 14 and 15 of the covers 12 and 13 respectively bearing against each other so that the two covers are coupled to each other.

The outer cover 12 is pivotable about pivots 16 and 27 which are mounted on inner wall portions 18 and 19 respectively of the side walls 3 and 4 respectively. The pivots 16 and 17 are fitted in recesses in side portions 20 and 21, respectively, of the front cover 12, which side portions extend substantially parallel to the side walls 3 and 4. The cover portions 20 and 21 are disposed substantially in line with the major portions 22 and 23, respectively, of the side walls 3 and 4, respectively. In order to permit this arrangement of the cover portions 20 and 21, the inner wall portions 18 and 29 are slightly inwardly offset relative to the associated major side wall portions 22 and 23. The inner wall portion 19 of the side wall 4 and the cover portion 21 are arranged close to each other. Between the cover portion 20 and the inner wall portion 18 of the side wall 3, however, a space 24 exists, which extends beyond the rear edge of the cover portion 20 between the inner side wall portion 18 and an outer side wall portion 25 The portion 25 adjoins and is coplanar with the major portion 22 of the side wall 3 and is formed with a recess 26 at the side of the housing at which the major wall 2 is situated. For correct engagement with the cover portion 20, part of the edge of the outer side wall portion 25 has an arcuate shape. Extending between the inner side wall portion 18 and the outer side wall portion 25 is a pivot 27 which extends parallel to the pivot 16 and which also provides a local reinforcement of the outer side wall portion 25.

Figure 2:
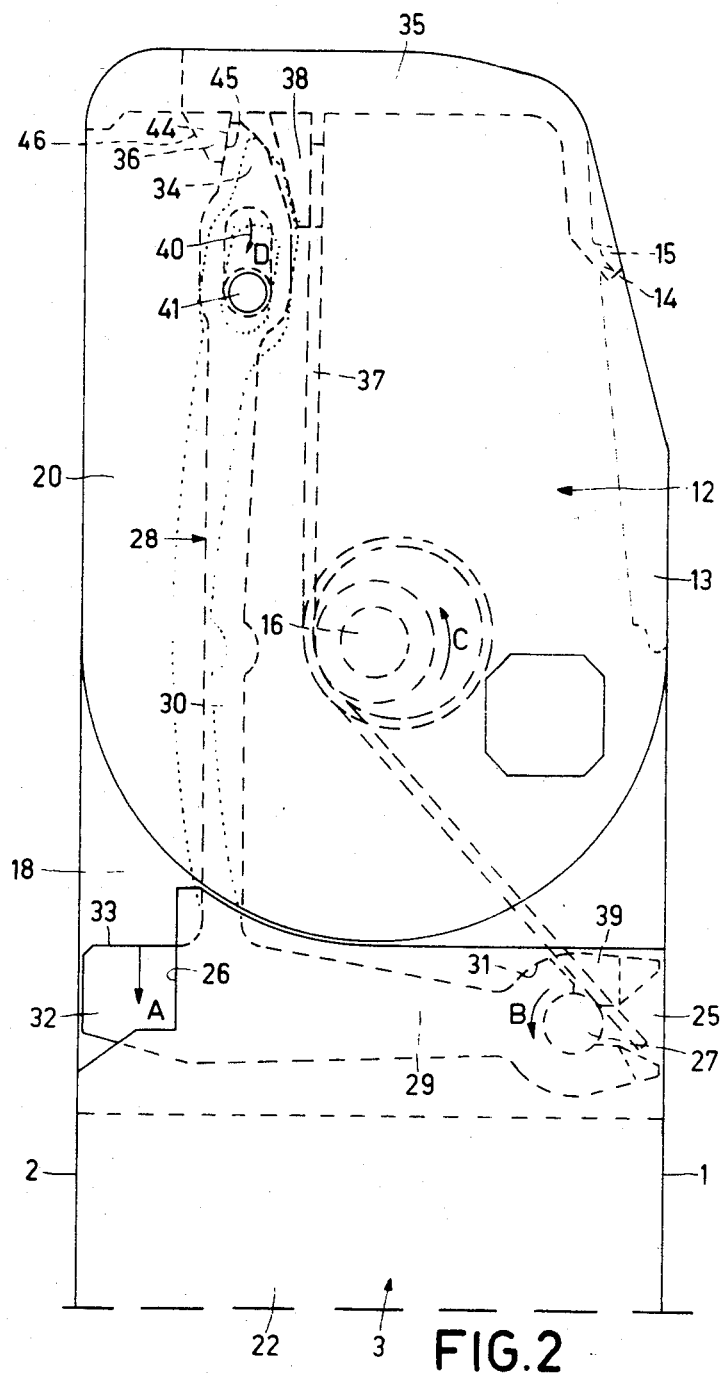
FIG. 2 is an enlarged side view of a part of the magnetic-tape cassette shown in FIG. 1, looking in the direction of the arrow II in FIG. 1.

A latching lever 28 is arranged in the space 24 so as to be pivotable about the pivot 27 and to extend substantially parallel to the side wall 3. The latching lever 28 comprises arms 29 and 30 arranged in the form of an L, the longer arm 30 being elastically deflectible. Suitably, the latching lever is made of a polyacetal plastic (such as Delrin), which is comparatively strong and yet has elastic properties. At its end which is remote from the longer arm the shorter arm 29 has a fork-shaped end portion 31 with resilient limbs which are so arranged relative to each other that the latching lever 28 can be mounted by simply pressing the limbs of the end portion 31 over the pivot 27, the limbs automatically snapping into position around the pivot. As is shown in FIG. 2, the shorter arm 29 is disposed in that part of the space 24 which is between the inner side wall portion 18 and the outer side wall portion 25. The width of the shorter arm 29 is such that it hardly bends at all when a force is exerted on it in a direction parallel to the side wall 3. The latching lever 28 further comprises a projection 32 which adjoins the shorter arm and which is disposed adjacent the recess 26 in the outer side wall portion 25, so as to be accessible for co-operation with unlatching means (not shown) on a magnetic-tape apparatus, on which the magnetic-tape cassette is placed. The unlatching means pivot the latching lever 28 about the pivot pin 27 from the operative latching position shown in FIG. 2 to an inoperative position. The unlatching means may comprise, for example, a pin mounted on the magnetic-tape apparatus in a position such that it pushes against an edge 33 of the projection 32 in the direction indicated by the arrow A, so that the latching lever 28 is pivoted about the pivot 27 in the direction indicated by the arrow B.

At its end which is remote from the shorter arm 29 the longer arm 30 of the latching lever 28 comprises a latching portion 34 which, during the pivotal movement of the latching lever about the pivot 27, is guided by guide means (to be described hereinafter) situated near the latching portion. The latching portion 34 is situated on the opposite side of the pivot 16 of the cover 12 from the pivot 27. A latching projection 36 on the inner side of a front portion 35 of the front cover 12, which extends between the side portions 20 and 21 thereof, engages the latching operation 34 when the cover 12 is in the closed position. In the latching position the latching portion 34, which is adjacent the front of the housing, in co-operation with the latching projection 36, ensures that the outer cover 12, and the inner cover 13 to which it is coupled, cannot be opened inadvertently. Also, in the space 24 there is provided a torsion spring 37 which has a plurality of turns arranged around the pivot 16 and one end of which bears against a projection 38 on the inner side of the front portion 35 of the cover 12. The other end of the spring 37 bears against the pivot 27. To permit this the fork-shaped end portion 31 of the shorter arm 29 of the latching lever is formed with a hole 39 for the spring 37. The spring 37 constantly urges the front cover 12 about the pivot 16 in the direction indicated by the arrow C towards the closed position. When the cassette is removed from the magnetic-tape apparatus the spring 37 ensures that the front covers 12 and 13 are pivoted back to the closed position as shown in FIG. 2.

In the longer arm 30 of the latching lever 28, adjacent the latching portion 34, a slot 40 is formed which extends in the longitudinal direction of the longer arm and which receives a pin 41 which extends parallel to the pivot 27 and which is connected to the inner side wall portion 18. The slot 40 and the pin 41 together from the aforesaid guide means for guiding the latching portion 34.

A magnetic-tape cassette according to the invention may have small dimensions and in particular is suitable for use with portable magnetic-tape equipment. An example of this is magnetic video-tape apparatus for recording signals from a video camera on a magnetic tape, which apparatus may be incorporated in a camera or may be carried separately therefrom, for example, in a separate case. For such uses it is essential that the magnetic-tape in the housing of the cassette is protected against contaminants and dust in an optimum manner. Moreover, as a result of the comparatively large front aperture or recess in the cassette housing, the portion 9 of magnetic tape which extends across the front aperture may readily be damaged if no special protection is provided. In the magnetic-tape cassette in accordance with the invention such as protection is provided by the two front covers 12 and 13, the inner cover 13 in particular ensuring that, viewed in FIG. 1, the central part of the front aperture or recess adjacent the major wall 1 is covered and the outer cover 12 ensuring that the front of the housing and the openings 42 and 43 provided adjacent the side walls 3 and 4 for the passage of the magnetic tape 8 are covered. Means, not shown, on the magnetic-tape apparatus ensure that each time the cassette is placed onto this apparatus the covers 12 and 13 are pivoted to the open position. As already stated above, the spring 37 and the coupling between the outer cover 12 and the inner cover 13 in the magnetic-tape cassette in accordance with the invention ensure that each time the cassette is removed from the magnetic-tape apparatus the two front covers swing back from the open position to the closed position in the direction indicated by the arrow C in FIG. 2. As a result of the presence of the aforesaid pin on the magnetic-tape apparatus the latching lever 28, after the cassette has been placed on the apparatus, is initially in the inoperative position, so that viewed in FIG. 2 the latching portion 34 is disposed in a position in which it is slightly retracted in the direction of the arrow D relative to the front of the housing. In this position the longer arm 30 of the latching lever is slightly bowed towards the major wall 2, so that as a result of the elasticity of the arm 30 the latching lever automatically swings back in a direction opposite to that of the arrow B when the pressure on the surface 33 of the projection 32 is removed. This movement, immediately after the closure of the front cover 12, causes a surface 45 of the latching portion 34 to engage with a slightly inclined surface 44 of the latching projection 36 on the front portion 35 of the front cover 12. At the end of this movement the arm 30 is relaxed. In the closed position of the front cover a substantial distance exists between the co-operating surfaces 44 and 45 on the one hand and the pivot 16 on the other hand. As a result, any attempt by the user to open the front cover 12 after removal of the magnetic-tape cassette from the magnetic-tape apparatus meets with substantial resistance. This in itself is a distinct warning to the user that the front covers 12 and 13 should not be opened when the cassette is off the magnetic-tape apparatus. If, nevertheless, by exerting a greater force the user attempts to open the front cover 12 and with it the front cover 13, the magnetic-tape cassette is accordance with the invention provides an effective protection against damage which may result from the exertion of such a force. In this situation the latching portion 34 is slightly pivoted about the pin 41, so that the longer arm 30 assumes the bowed position shown by the broken lines in FIG. 2. Due to this bowing of the arm 30 the latching portion 34 is again moved slightly in the direction of the arrow D, so that the surface 45 is disengaged from the surface 44. In this way damage to the latching lever, the latching projection or the front cover 12 is precluded in an effective manner. When the front cover is being closed the surface 45 of the latching portion 34 is again brought into engagement with the surface 44 of the latching projection 36 as a result of the slightly wedge-shaped end of the latching portion 34, which end slides over an oblique surface 46 of the latching projection 36, so that the front cover 12 is latched again. As a result of this latching of the front covers the construction of the magnetic-tape cassette in accordance with the invention provides a very effective protection against external influences. A further advantage of locating the latching lever in the space 24 near a front corner of the housing is that an effective latching of the front cover is obtained within a minimal space. In this respect it is of special advantage that the latching lever requires no additional spring for the return movement to the latching position.

A further advantage of the front-cover latching used in the cassette in accordance with the invention is that it may be used both in cassette housings comprising two housing sections of substantially equal height and in housings having a box-and-lid construction. In either case the latching lever can be mounted simply by snapping it onto the pivot 27.

It is to be noted that in an alternative embodiment, not shown, the magnetic-tape cassette in accordance with the the invention may be equipped with a latching lever near both the first side wall 3 and the second side wall 4, in which case adequate space should be provided between the second side wall and the side portion 21 of the front cover 12. This results in a particularly stable latching, which can also be achieved within small cassette housings.

The latching lever 28 may be of a different material from that mentioned earlier herein, for example, it may be made of metal. Whatever material is used, it is important that the longer arm 30, between the point where it is connected to the shorter arm 29 and the latching portion 34, has an elasticity such that it is capable of elastic deflection.

What is claimed is:

1. A magnetic-tape cassette comprising:
   a housing having major walls, first and second substantially parallel side walls, and a front with a front aperture or recess between the major walls,
   a magnetic tape which has a portion which extends across said front aperture or recess in the housing to cooperate with parts of a magnetic-tape cassette apparatus;
   a cover pivot which is perpendicular to the side walls of the housing,
   at least one front cover which is pivotable about said cover pivot from an open position to a closed position which front cover at least partly covers the front aperture or recess in the housing in the closed position;
   a lever pivot which is connected to the housing,
   a least one latching lever which is pivotable about said lever pivot, situated near one of the side walls, from an inoperative position to a latching position in which the latching lever latches the front cover in the closed position; and
   spring means for biasing said lever from the inoperative position toward the latching position,
   characterised in that the latching lever comprises two arms of different lengths arranged in the form of an L, the longer arm being elastically deflectible over at least part of its length and comprising a latching portion at an end which is remote from the shorter arm; and the shorter of said arms is connected to the pivot for the latching lever at an end which is remote from the longer arm,
   the pivot of the latching lever extends substantially parallel to the pivot of the front cover and is connected to said one of the side walls of the housing, and
   the cassette further comprises guide means disposed near the latching portion for guiding said portion during the pivotable movement of the latching lever.

2. A magnetic-tape cassette as claimed in claim 1, characterised in that the latching portion is situated on the opposite side of the pivot of the front cover from the pivot of the latching lever.

3. A magnetic-tape cassette as claimed in claim 2, characterised in that in the latching position the latching portion is situated adjacent the front of the housing and engages with a latching projection on the inner side of a front portion of the front cover.

4. A magnetic-tape cassette as claimed in claim 1, 2 or 3, characterised in that the shorter arm of the latching lever comprises a fork-shaped end portion with resilient limbs which clamp around the pivot of the latching lever.

5. A magnetic-tape cassette as claimed in claim 1, characterized in that adjacent the latching portion the longer arm of the latching lever has a slot which extends in the longitudinal direction of the longer arm, and the cassette comprises a pin which extends through the slot parallel to the pivot of the latching lever and is connected to said one of the side walls of the housing.

6. A magnetic-tape cassette as claimed in claims 1, 5, 2, or 3, in which the front cover comprises side portions which are arranged at the sides of the housing substantially parallel to the side walls thereof and are connected to the pivot of the front covers and which are disposed substantially in line with major portions of the side walls, which side walls comprise inner wall portions disposed on the inner sides of the side portions of the front cover, characterised in that at least said one of the side walls further comprises an outer wall portion which adjoins the major portion of that side wall, the pivot of the latching lever extends between the inner and outer wall portions of said one of the side walls, and the latching lever is arranged in a space which is bounded on one side by the inner wall portion of said one of the side walls and the other side by the adjacent side portion of the front cover and the outer wall portion of said one of the side walls.

7. A magnetic-tape cassette are claimed in claim 6, characterised in that the shorter arm of the latching lever is situated between the inner wall portion and the outer wall portion of said one of the side walls and the latching lever comprises a projection which adjoins the shorter arm and which is disposed at the location of a recess in said outer side wall portion.

8. A magnetic-tape cassette as claimed in claim 6, characterised by comprising a spring disposed in the space in which the latching lever is situated for closing the front cover, the spring having a plurality of turns arranged around the pivot of the front cover and one end of the spring bearing against the pivot of the latching lever.

9. A magnetic-tape cassette as claimed in claim 3, characterised in that the magnetic-tape cassette comprises means for coupling the outer and inner front covers to each other such that when the outer cover is pivoted the inner cover moves with it, the outer cover carrying the latching projection and the inner cover being latched when the outer cover is latched.

10. A magnetic-tape cassette as claimed in claim 9, characterized in that the shorter arm of the latching lever comprises a fork-shaped end portion with resilient limbs which clamp around the pivot of the latching lever.

11. A magnetic-tape cassette as claimed in claim 9, characterized in that adjacent the latching portion the longer arm of the latching lever has a slot which extends in the longitudinal direction of the longer arm, and the cassette comprises a pin which extends through the slot parallel to the pivot of the latching lever and is connected to said one of the side walls of the housing.

12. A magnetic-tape cassette as claimed in claim 4, characterized in that adjacent the latching portion the longer arm of the latching lever has a slot which extends in the longitudinal direction of the longer arm, and the cassette comprises a pin which extends through the slot parallel to the pivot of the latching lever and is connected to said one of the side walls of the housing.

13. A magnetic-tape cassette as claimed in claim 3, characterized in that adjacent the latching portion the longer arm of the latching lever has a slot which extends in the longitudinal direction of the longer arm, and the cassette comprises a pin which extends through the slot parallel to the pivot of the latching lever and is connected to said one of the side walls of the housing.

14. A magnetic-tape cassette as claimed in claim 1, characterized by comprising means for coupling the outer and inner front covers to each other such that when the outer cover is pivoted the inner cover moves with it, the outer cover carrying a latching projection and the inner cover being latched when the outer cover is latched.

* * * * *